US011455893B2

(12) United States Patent
Stepp et al.

(10) Patent No.: US 11,455,893 B2
(45) Date of Patent: Sep. 27, 2022

(54) TRAJECTORY CLASSIFICATION AND RESPONSE

(71) Applicant: THE BOEING COMPANY, Chicago, IL (US)

(72) Inventors: Nigel Stepp, Santa Monica, CA (US); Sean Soleyman, Calabasas, CA (US); Deepak Khosla, Camarillo, CA (US)

(73) Assignee: THE BOEING COMPANY, Chicago, IL (US)

(*) Notice: Subject to any disclaimer, the term of this patent is extended or adjusted under 35 U.S.C. 154(b) by 350 days.

(21) Appl. No.: 16/816,488

(22) Filed: Mar. 12, 2020

(65) Prior Publication Data
US 2021/0287554 A1    Sep. 16, 2021

(51) Int. Cl.
*G08G 5/00* (2006.01)
*G05D 1/10* (2006.01)
*G06N 20/00* (2019.01)
*G06K 9/62* (2022.01)

(52) U.S. Cl.
CPC ............ *G08G 5/003* (2013.01); *G05D 1/104* (2013.01); *G06K 9/6219* (2013.01); *G06K 9/6267* (2013.01); *G06N 20/00* (2019.01)

(58) Field of Classification Search
CPC ........ G08G 5/003; G06N 20/00; G05D 1/104; G06K 9/6219; G06K 9/6267
USPC .......................................................... 701/3
See application file for complete search history.

(56) References Cited

U.S. PATENT DOCUMENTS

| 9,613,527 | B2* | 4/2017 | Pfeifle ..................... G06F 16/27 |
| 9,632,672 | B2* | 4/2017 | Gnezdov ................. H04L 41/22 |
| 10,743,990 | B2* | 8/2020 | Gloss .................... A61F 2/2439 |
| 2014/0052763 | A1* | 2/2014 | Sato ........................ G06F 16/29 |
|  |  |  | 707/805 |
| 2020/0334571 | A1* | 10/2020 | Bai ........................... G06T 7/20 |

OTHER PUBLICATIONS

Besse, Philippe et al., "Review Perspective for Distance Based Trajectory Clustering," arXiv:1508.04904v1 [stat. ML] Aug. 20, 2015, pp. 1-10.
Driemel, Anne et al., "Clustering time series under the Frechet distance," In the Proceedings of the Twenty-Seventh Annual ACM-SIAM Symposium on Discrete Algorithms, Society of Industrial and Applied Mathematics, Dec. 15, 2015, 53 pgs.
(Continued)

*Primary Examiner* — Gertrude Arthur Jeanglaude
(74) *Attorney, Agent, or Firm* — Moore IP Law

(57) ABSTRACT

A method includes obtaining multiple sets of trajectory data, each descriptive of trajectories of two or more objects (e.g., first and second objects). The method also includes generating transformed trajectory data based on the trajectory data. Each set of transformed trajectory data is descriptive of the trajectories of the two or more objects in a normalized reference frame in which a movement path of the first object is constrained. The method further includes generating feature data, performing a clustering operation based on the feature data to generate a set of trajectory clusters, and generating training data based on the set of trajectory clusters. The method further includes using the training data to train a machine learning classifier to classify particular trajectory patterns.

40 Claims, 10 Drawing Sheets

(56) References Cited

OTHER PUBLICATIONS

Eiter, Thomas et al., "Computing Discrete Frechet Distance," Tech. Report CD-TR 94/64, Information Systems Department, Technical University of Vienna, 1994, 8 pgs.

Frechet, M. Maurice, "Sur Quelques Points Du Calcul Fonctionnel," Rendiconti del Circolo Matematico di Palermo (1884-1940), 22(1), pp. 1-72.

Kenefic, Richard, "Track Clustering Using Frechet Distance and Minimum Description Length," Journal of Aerospace Information Systems, vol. 11, No. 8, Aug. 2014, 13 pgs.

Wikipedia, "Complete-linkage clustering," https://en.wikipedia.org/wiki/Complete-linkage_clustering, pp. 1-4.

\* cited by examiner

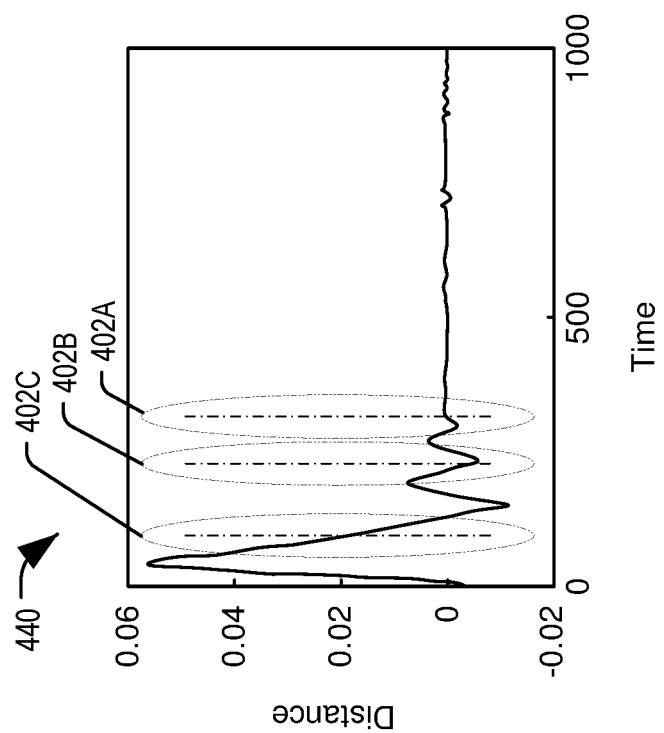
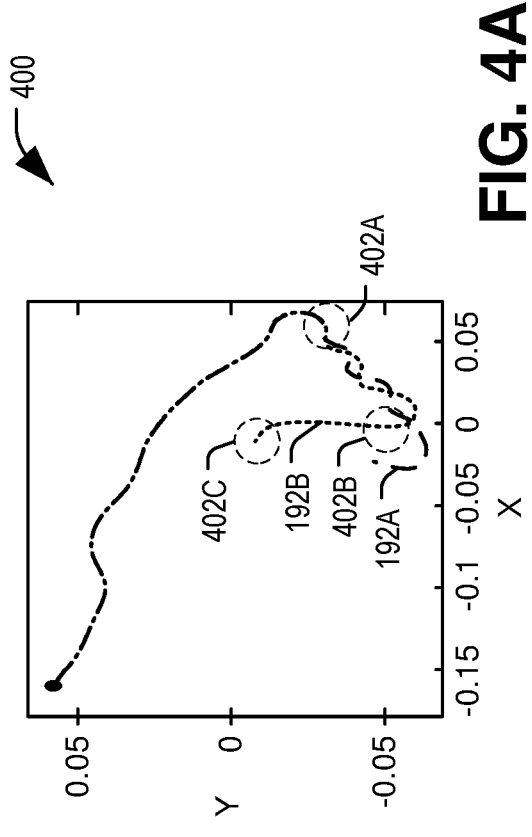
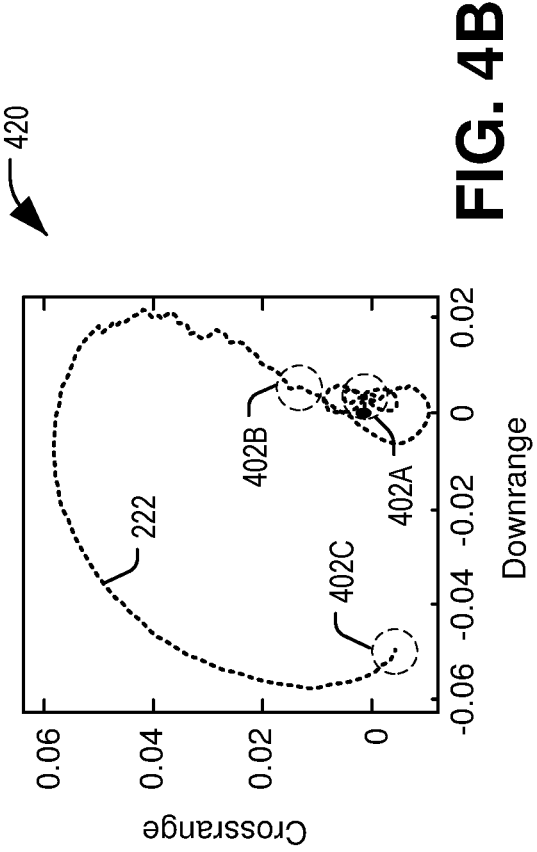
FIG. 4A
FIG. 4B
FIG. 4C

TRAJECTORY CLASSIFICATION AND RESPONSE

FIELD OF THE DISCLOSURE

The present disclosure is generally related to trajectory classification and response.

BACKGROUND

There are many situations in which it is useful to track the movement of two or more objects with respect to one another and to make decision based on the past movements or predicted future movements. For example, the movements of aircraft and spacecraft are tracked for trajectory planning (e.g., to avoid loss of a separation distance). Similar tracking operations are performed for land- and water-based vehicles, such as when automated vehicles interact with one another or with human controlled vehicles.

The complexity of trajectory-based decision-making increases as the number of objects involved increases. Additionally, trajectory-based decision making is more complicated for situations in which the objects being tracked can move in three dimensions rather than for situations in which the objects move essentially in only two dimensions. Accordingly, it is more complicated (e.g., requires more computing resources) to make trajectory-based decision based on the movements of two or more aircraft, satellites, or submersible vehicles than it is to make trajectory-based decision based on the movements of two or more surface vehicles (e.g., two land vehicles or two surface water vehicles).

SUMMARY

In a particular implementation, a system includes one or more processors and one or more memory devices coupled to the one or more processors. The one or more memory devices store instructions that are executable by the one or more processors to cause the one or more processors to obtain multiple sets of trajectory data. Each set of trajectory data is descriptive of trajectories of two or more objects, and the two or more objects include a first object and a second object. The instructions are further executable to cause the one or more processors to generate multiple sets of transformed trajectory data based on the multiple sets of trajectory data. Each set of transformed trajectory data corresponds to a set of the trajectory data and is descriptive of the trajectories of the two or more objects in a normalized reference frame in which a movement path of the first object is constrained. The instructions are further executable to cause the one or more processors to generate feature data based on the sets of transformed trajectory data. The instructions are further executable to cause the one or more processors to perform a clustering operation based on the feature data to generate a set of trajectory clusters and to generate training data based on the set of trajectory clusters. The instructions are further executable to cause the one or more processors to use the training data to train a machine learning classifier to classify particular trajectory patterns.

In another particular implementation, a method includes obtaining multiple sets of trajectory data. Each set of trajectory data is descriptive of trajectories of two or more objects, and the two or more objects include a first object and a second object. The method also includes generating multiple sets of transformed trajectory data based on the multiple sets of trajectory data. Each set of transformed trajectory data corresponds to a set of the trajectory data and is descriptive of the trajectories of the two or more objects in a normalized reference frame in which a movement path of the first object is constrained. The method further includes generating feature data based on the sets of transformed trajectory data. The method also includes performing a clustering operation based on the feature data to generate a set of trajectory clusters and generating training data based on the set of trajectory clusters. The method further includes using the training data to train a machine learning classifier to classify particular trajectory patterns.

In another particular implementation, a computer-readable storage device stores instructions that are executable by one or more processors to cause the one or more processors to perform operations including obtaining multiple sets of trajectory data. Each set of trajectory data is descriptive of trajectories of two or more objects, and the two or more objects include a first object and a second object. The operations also include generating multiple sets of transformed trajectory data based on the multiple sets of trajectory data. Each set of transformed trajectory data corresponds to a set of the trajectory data and is descriptive of the trajectories of the two or more objects in a normalized reference frame in which a movement path of the first object is constrained. The operations further include generating feature data based on the sets of transformed trajectory data. The operations also include performing a clustering operation based on the feature data to generate a set of trajectory clusters and generating training data based on the set of trajectory clusters. The operations further include using the training data to train a machine learning classifier to classify particular trajectory patterns.

In a particular implementation, a system includes one or more processors and one or more memory devices coupled to the one or more processors. The one or more memory devices store instructions that are executable by the one or more processors to cause the one or more processors to obtain trajectory data descriptive of trajectories of two or more objects, where the two or more objects include a first object and a second object. The instructions are further executable to cause the one or more processors to generate transformed trajectory data based on the trajectory data. The transformed trajectory data is descriptive of the trajectories of the two or more objects in a normalized reference frame in which a movement path of the first object is constrained. The instructions are further executable to cause the one or more processors to generate feature data based on the transformed trajectory data. The instructions are further executable to cause the one or more processors to provide the feature data as input to a machine learning classifier to determine a trajectory pattern associated with the trajectory data and to initiate a response action based on the trajectory pattern.

In a particular implementation, a method includes obtaining trajectory data descriptive of trajectories of two or more objects, where the two or more objects include a first object and a second object. The method also includes generating transformed trajectory data based on the trajectory data. The transformed trajectory data is descriptive of the trajectories of the two or more objects in a normalized reference frame in which a movement path of the first object is constrained. The method further includes generating feature data based on the transformed trajectory data. The method also includes providing the feature data as input to a machine learning classifier to determine a trajectory pattern associated with the trajectory data and initiating a response action based on the trajectory pattern.

In a particular implementation, a computer-readable storage device storing instructions that are executable by one or more processors to cause the one or more processors to perform operations including obtaining trajectory data descriptive of trajectories of two or more objects, where the two or more objects include a first object and a second object. The operations also include generating transformed trajectory data based on the trajectory data. The transformed trajectory data is descriptive of the trajectories of the two or more objects in a normalized reference frame in which a movement path of the first object is constrained. The operations further include generating feature data based on the transformed trajectory data. The operations also include providing the feature data as input to a machine learning classifier to determine a trajectory pattern associated with the trajectory data and initiating a response action based on the trajectory pattern.

The features, functions, and advantages described herein can be achieved independently in various implementations or may be combined in yet other implementations, further details of which can be found with reference to the following description and drawings.

BRIEF DESCRIPTION OF THE DRAWINGS

FIGS. 4A, 4B, and 4C are diagrams that illustrate an example of trajectory normalization and segmentation by the system of FIG. 1 according to a particular implementation.

DETAILED DESCRIPTION

Figure 1:
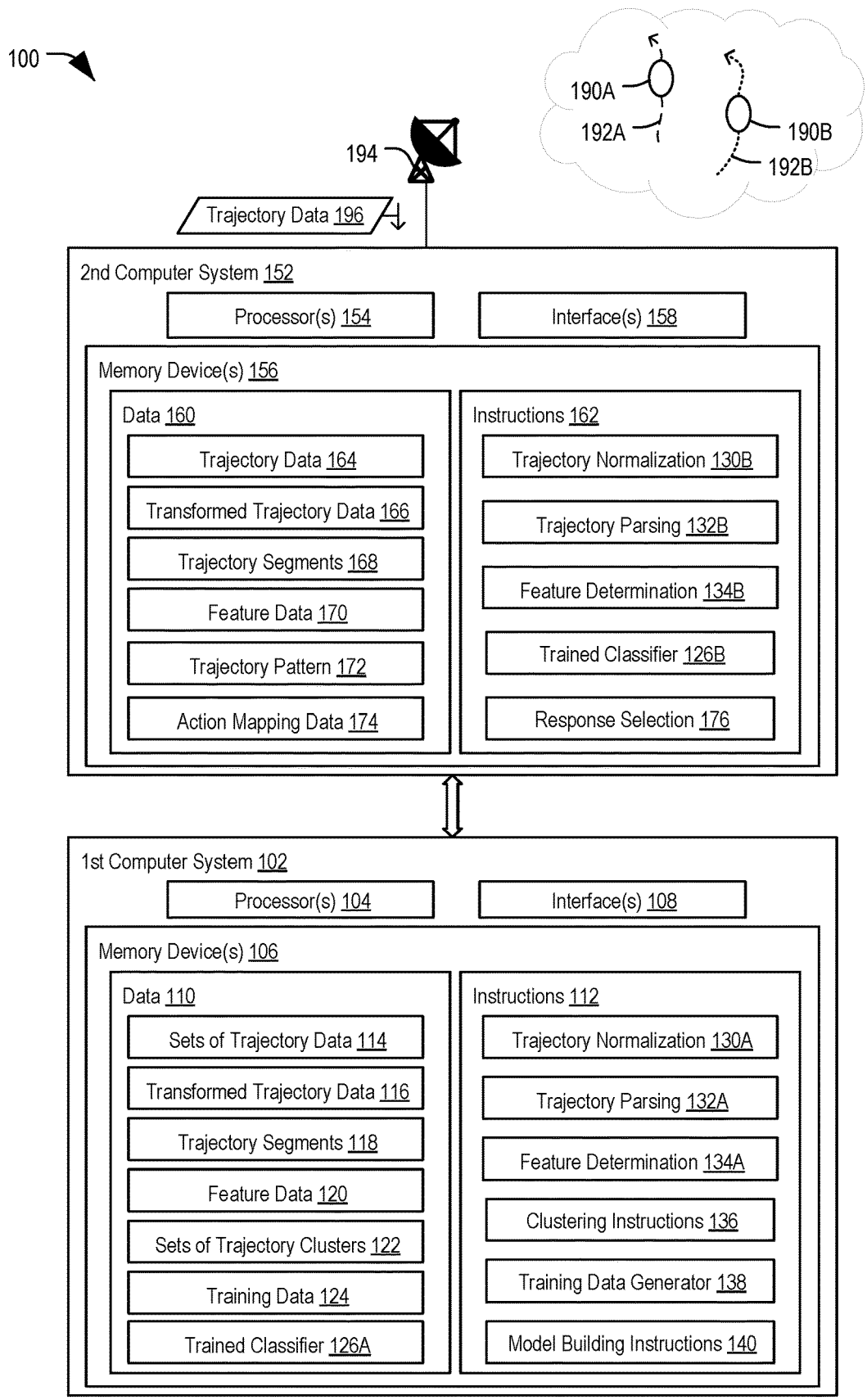
FIG. 1 is a diagram that illustrates a system for trajectory classification and response according to a particular implementation.

Aspects disclosed herein present systems and methods for trajectory classification and response. Historical or simulated trajectory data is used to train a machine learning system to classify the movements of two or more objects into a set of recognized trajectory patterns, to predict near-term future movements of the two or more objects, to recommend or implement responses based on movements of two or more objects, or combinations thereof. The historical or simulated trajectory data for objects is normalized to a reference frame associated with one of the objects (e.g., a reference object) to produce normalized trajectory data. In the normalized reference frame, the movement of the reference object is projected along a single axis (or otherwise constrained in a manner that simplifies computation) and the movements of the other objects are described relative to the reference object. Transforming the trajectory data to the normalized reference frame reduced dimensionality of the computations used to evaluate the trajectories. For example, in the normalized reference frame, three-dimensional movement of an object can be described in two dimensions (e.g., in terms of the movement of the object along a path that is parallel to the path of the reference object or in terms of movement of the object along a path that is perpendicular to the path of the reference object). This reduction in dimensionality reduces computation resources (e.g., processor cycles and memory utilization) needed to analyze the trajectory data and to make decision or recommendations based on the trajectory data.

In some implementations, the trajectories in the normalized reference frame are parsed into trajectory segments based on changes in behavior. For example, a behavior change can be detected when a movement pattern of two or more objects in the normalized reference changes. Parsing the trajectories into segments simplifies recognition of short-term behavior of the objects and improves classification of dynamic behavior (e.g., changing behavior patterns over time).

In a particular implementation, the normalized trajectory data is used to generate training data to train the machine learning system. For example, an unsupervised learning operation (e.g., a clustering operation) can be used to identify sets of normalized trajectories that exhibit similar behavior patterns. In this example, each set of normalized trajectory data represents two or more trajectories (e.g., a pair of trajectories). To illustrate, each pair of normalized trajectory can be described or summarized by feature data, such as a Frechet distance between two curves. For purposes of clustering the normalized trajectories, the feature data represents a point in a feature space, and a clustering operation identifies similar sets of normalized trajectories based on distances between points in the features space. Each cluster is assigned a unique identifier (either by the computer system that generated the cluster or by a user). Thus, each unique identifier is a label designating a cluster of sets of normalized trajectories that exhibit similar behavior (e.g., have a similar Frechet distance). The unique identifiers and feature data for the sets of normalized trajectories together are used as training data.

The training data is used to train a machine learning data model, such as neural network, a decision tree, a support vector machine, or another data model to generate classifications, predictions, or both, based on input trajectory data. The training enables the machine learning data model to classify a set of input trajectory data into one of the identified clusters, which indicates a behavior pattern associated with the set of input trajectory data. Depending on the type of machine learning data model, the training may also enable the machine learning data model to assign a confidence value to the classification, to predict future trajectory information, to assign a confidence value to such a prediction, to make a recommendation or selection a response action, or a combination thereof.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple objects are illustrated and associated with reference numbers 190A and 190B. When referring to a particular one of these objects, such as the first object 190A, the distinguishing letter "A" is used. However, when referring to any arbitrary one of these objects or to these objects as a group, the reference number 190 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a first computer system 102 including one or more processors 104 ("processor(s)" 104 in FIG. 1), which indicates that in some implementations the first computer system 102 includes a single processor 104 and in other implementations the first computer system 102 includes multiple processors 104. For ease of reference herein, such features are generally introduced as "one or more" features and may subsequently be referred to in the singular or in the plural.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates a system 100 for trajectory classification and response according to a particular implementation. In FIG. 1, the system 100 includes the first computer system 102 and a second computer system 152. In FIG. 1, the first computer system 102 is configured to generate a trained classifier 126A, and the second computers system 152 is configured to use a trained classifier 126B to detect and label trajectory patterns (e.g., representative trajectory pattern 172) and to select a response action based on the trajectory pattern 172.

In some implementations, the first and second computers systems 102, 152 are combined within a single computer system, e.g., a computer system that both generates and uses a trained classifier. However, in the following description, the first and second computers systems 102, 152 are treated as distinct computer systems to facilitate description of operations performed during generations of the trained classifier 126A and operations performed during use of the trained classifier 126B. In implementations in which the first and second computers systems 102, 152 are distinct, data can be communicated between the first and second computers systems 102, 152 indirectly, such as via a portable memory device (e.g., a portable hard-drive or memory card). In some such implementations, the first and second computers systems 102, 152 are interconnected via one or more networks to enable data communications. For example, the first computer system 102 is coupled to the second computer system 152 via one or more wireless networks, one or more wireline networks, or any combination thereof. Two or more of the first and second computers systems 102, 152 can be co-located or geographically distributed from each other.

In the example illustrated in FIG. 1, the first computer system 102 includes the processor(s) 104 coupled to one or memory devices 106 and one or more interfaces 108. The interfaces 108 facilitate communication between the first computer system 102 and other computing devices, such as the second computer system 152. The memory devices 106 include a computer-readable medium that stores instructions 112 that are executable by the processors 104. The instructions 112 are executable to initiate, perform or control operations to aid generation of the trained classifier 126A. The memory devices 106 also store data 110 used by or generated by the processors 104 during execution of the instructions 112. The processors 104 can be implemented as a single processor or as multiple processors, such as in a multi-core configuration, a multi-processor configuration, a distributed computing configuration, a cloud computing configuration, or any combination thereof. In some implementations, one or more portions of the instructions 112 are executed by the processors 104 using dedicated hardware, firmware, or a combination thereof.

In the example illustrated in FIG. 1, the instructions 112 are grouped into functional blocks to facilitate description of various operations performed during execution of the instructions 112. The illustrated functional blocks correspond to trajectory normalization instructions 130A, trajectory parsing instructions 132A, feature determination instructions 134A, clustering instructions 136, training data generator instructions 138, and model building instructions 140. In some implementations, the instructions 112 include different functional blocks. For example, two or more of the functional blocks can be combined within a single set of instructions (e.g., a single routine, sub-routine, application programming interface (API), or other executable code). As another example, in some implementations, one or more of the functional blocks illustrated are omitted. To illustrate, in FIG. 1, the instructions 112 include the trajectory parsing instructions 132A, which are executable to parse trajectories into trajectory segments 118. In some implementations, the trajectories are analyzed as a whole (e.g., are not parsed into trajectory segments 118), in which case the trajectory parsing instructions 132A can be omitted.

During operation of the first computer system 102, the processors 104 obtain multiple sets of trajectory data 114. In FIG. 1, the sets of trajectory data 114 are stored at the memory devices 106 of the first computer system 102; however, in other implementation, the sets of trajectory data 114 can be obtained from another computing device (not shown) or a data store that stores simulate or historical sets of trajectory data 114. Each set of trajectory data 114 is descriptive of the trajectories of two or more objects. For example, a set of trajectory data 114 can include data descriptive of a trajectory 192A of the first object 190A and a corresponding trajectory 192B of the second object 190B during an encounter or interaction between the objects 190. The sets of trajectory data 114 are descriptive of relative positions and movements of the objects 190. To illustrate, one of the sets of the trajectory data 114 indicates the position of the second object 190B relative to the position of the first object 190A at each sample point during a sample period. Generally, positions and movements are indicated in a set of trajectory data 114 in a three-dimensional (3D) coordinate system, such as 3D Cartesian coordinate system or a spherical coordinate system.

The trajectory normalization instructions 130A are executable by the processors 104 to generate multiple sets of transformed trajectory data 116 based on the multiple sets of trajectory data 114. Each set of transformed trajectory data 116 corresponds to a set of the trajectory data 114 normalized into a reference frame in which a movement path of the first object 190A is constrained (e.g., to movement along a single axis or dimension). For example, to generate the transformed trajectory data 116, all movement of the second object 190B relative to the first object 190A can be described as crossrange motion or downrange motion relative to a heading of the first object 190A. As used herein, "crossrange" motion refers to movement that is perpendicular to the heading of the first object 190A, and "downrange" motion refers to movement that is parallel to the heading of the first object 190A.

The trajectory parsing instructions 132A are executable to parse one or more of the sets of transformed trajectory data 116 to generate trajectory segments 118. Each trajectory segment 118 corresponds to a portion of a set of transformed trajectory data 116 that includes a particular type of motion. For example, the trajectory parsing instructions 132A parse a particular set of transformed trajectory data 116 by detecting a change point in a pair of trajectories (e.g., the trajectories 192A and 102B) represented by the particular set of transformed trajectory data 116. The change point can be detected in the trajectory data 114 or in the transformed trajectory data 116. The trajectory parsing instructions 132A divide a set of transformed trajectory data 116 into two segments at the change point. As a result, a first segment is generated to correspond to a first portion of the particular set of transformed trajectory data 116 representing movements before the change point, and a second segment is generated to correspond to a second portion of the particular set of transformed trajectory data 116 representing movements after the change point.

A set of transformed trajectory data 116 can be parsed into more than two segments if more than one change point is detected. In a particular implementation, a change point represents a divergence in a behavior pattern of the relative positions of the objects 190. For example, a change point can be detected by determining a divergence value based on a first distribution (e.g., a histogram) of relative positions during a first time window and a second distribution of the relative positions during a second time window that follows the first time window. In this example, the change point is detected responsive to the divergence value satisfying a boundary criterion.

The feature determination instructions 134A are executable to generate feature data 120 based on the sets of transformed trajectory data 116. In some implementations, the feature data 120 is based on the trajectory segments 118. To illustrate, the feature data 120 includes a plurality of data elements, and each data element of the plurality of data elements represents a respective set of transformed trajectory data 116. As an example, each data element of the feature data 120 can include or correspond to a Fréchet distance between trajectories of a pair of trajectories of the sets of trajectory data 114.

The clustering instructions 136 are executable to perform a clustering operation based on the feature data 120 to generate a set of trajectory clusters 122. For example, the feature data 120 for each trajectory segment 118 can be treated as a point in a multi-dimensional features space. In this example, the clustering operation identifies groups of points in the features space that are similar, based on distance in the feature space. In some implementations, the clustering operation includes or corresponds to a hierarchical clustering operation, such as an agglomerative clustering operation or a divisive clustering operation.

The training data generator instructions 138 are executable to generate training data 124 based on the set of trajectory clusters 122. In some implementations, generating the training data 124 includes associating a label with each trajectory cluster of the sets of trajectory clusters 122. In such implementations, the training data 124 includes the sets of transformed trajectory data 116 and the label(s) associated with each set of transformed trajectory data 116. The label associated with a particular set of transformed trajectory data 116 is based on a particular trajectory cluster 122 to which the particular set of transformed trajectory data 116 is assigned. The labels can be descriptive (e.g., can convey information about the trajectory data 114 or cluster 122 to a human) or can be computer assigned unique identifiers.

The model building instructions 140 are executable to use the training data 124 to train a machine learning classifier (the "trained classifier" 126A in FIG. 1) to classify particular trajectories into trajectory patterns. For example, the model building instructions 140 can use a supervised machine learning technique (or several machine learning techniques) to generate the trained classifier 126A. The trained classifier 126A can include or correspond to an artificial neural network, a support vector machine, a decision tree, or a variant or ensemble of any combination thereof. The trained classifier 126A is configured to identify the type of trajectory pattern that is represented by trajectory data input to the trained classifier 126A. In particular implementations, the trained classifier 126A is trained to output a label (e.g., one of the labels from the training data 124) indicating to which cluster of the sets of trajectory clusters 122 a trajectory pair described by the input trajectory data would be assigned. In some such implementations, the output can further include a projection or prediction of a future position of one of the objects 190 based on historical data (e.g., the sets of trajectory data 114).

The label thus classifies the input trajectory data into a trajectory pattern, which can be used for various purposes, such as tactical or strategic analysis, response planning, or controlling one or more of the objects 190. For example, in some implementations, after the trained classifier 126A is generated, the data descriptive of trajectories of two or more aircraft can be provided as input to the trained classifier 126A to generate a trajectory pattern classification output (e.g., a label), and the trajectory pattern classification output can be used to modify a trajectory of a first aircraft of the two or more aircraft relative to a second aircraft of the two or more aircraft.

Normalization of the sets trajectory data 114 reduces the size of the feature data set needed to enable clustering of the sets of trajectory data 114. Thus, the trajectory normalization operations performed by the trajectory normalization instructions 130 have the technical benefit of reducing processing resources and memory space that the first computer system 102 uses to generate the training data 124 relative to a computer system that attempts to cluster the sets of trajectory data 114 without first normalizing them. Additionally, trajectory normalization enables analysis of trajectories of an arbitrary number of objects 190 from the viewpoint of a single of the objects (e.g., the object 190 whose movement path is constrained by the normalization. In some contexts, encounters between the objects 190 can be very dynamic. To illustrate, when the objects 190 are hostile to one another or where the objects 190 have different goals (e.g., the first object 190A is trying to approach the second object 190B but the second object 190B is trying to maintain a separation distance), the trajectories 192 can change dramatically over time. The trajectory parsing instructions 132A facilitate detecting such changes, which can lead to more accurate grouping of the sets of trajectory data 114 into the sets of trajectory clusters 122 associated with individually recognizable or simple behavior patterns.

In some implementations, the first computer system 102 generates and uses the trained classifier 126. In other implementations, the first computer system 102 generates the trained classifier 126, and another computer system (e.g., the second computer system 152) subsequently uses the trained classifier 126. For example, the second computer system 152 can use a first version of the trained classifier (e.g., trained classifier 126B) while the first computer system 102 trains an updated version of the trained classifier (e.g., trained classifier 126A) based on updated or additional sets of trajectory data 114.

In the example illustrated in FIG. 1, the second computer system 152 includes one or more processors 154 coupled to one or memory devices 156 and one or more interfaces 158. The interfaces 158 facilitate communication between the second computer system 152 and other computing devices, such as the first computer system 102 or a system 194 that generates or obtains real-time trajectory information for the objects 190. The memory devices 156 include a computer-readable medium that stores instructions 162 that are executable by the processors 154. The instructions 162 are executable to initiate, perform or control operations to use the trained classifier 126B to analyze trajectory data 196 and respond based on a result of the analysis. The memory devices 156 also store data 160 used by or generated by the processors 154 during execution of the instructions 162.

The processors 154 can be implemented as a single processor or as multiple processors, such as in a multi-core configuration, a multi-processor configuration, a distributed computing configuration, a cloud computing configuration, or any combination thereof. In some implementations, one or more portions of the instructions 162 are executed by the processors 154 using dedicated hardware, firmware, or a combination thereof.

In the example illustrated in FIG. 1, the instructions 162 are grouped into functional blocks to facilitate description of various operations performed during execution of the instructions 162. The illustrated functional blocks correspond to trajectory normalization instructions 130B, trajectory parsing instructions 132B, feature determination instructions 134B, the trained classifier 126B, and response selection instructions 176. In some implementations, the instructions 162 include different functional blocks. For example, two or more of the functional blocks can be combined within a single set of instructions (e.g., a single routine, sub-routine, application programming interface (API), or other executable code). As another example, in some implementations, one or more of the functional blocks illustrated are omitted. To illustrate, in FIG. 1, the instructions 162 include the trajectory parsing instructions 132B, which are executable to parse trajectories into trajectory segments. In some implementations, the trajectories are analyzed as a whole (e.g., are not parsed into trajectory segments), in which case the trajectory parsing instructions 132B can be omitted.

During operation of the second computer system 152, the processors 154 obtain trajectory data 164. The trajectory data 164 includes or corresponds to the real-time trajectory data 196 obtained by (e.g., sensed by) the system 194 or includes or corresponds to historical trajectory data for the objects 190. The trajectory data 164 is descriptive of the trajectories of two or more objects. For example, the trajectory data 164 can include data descriptive of the trajectory 192A of the first object 190A and the corresponding trajectory 192B of the second object 190B. The trajectory data 164 are descriptive of relative positions and movements of the objects 190. Generally, the positions and movements are indicated in a 3D coordinate system, such as 3D Cartesian coordinate system or a spherical coordinate system.

In the example illustrated in FIG. 1, the trajectory normalization instructions 130B, the trajectory parsing instructions 132B, and the feature determination instructions 134B are instances of the trajectory normalization instructions 130A, the trajectory parsing instructions 132A, and the feature determination instructions 134A, respectively, and perform similar operations as described above. For example, the trajectory normalization instructions 130B are executable to generate transformed trajectory data 166 based on the trajectory data 164. The transformed trajectory data 166 is descriptive of the trajectories 192 of the objects 190 in a normalized reference frame in which a movement path of the first object 190A is constrained (e.g., to movement along a single axis or dimension). For example, to generate the transformed trajectory data 166, all movement of the second object 190B relative to the first object 190A is described as crossrange motion or downrange motion relative to a heading of the first object 190A.

Additionally, the trajectory parsing instructions 132B are executable to parse the transformed trajectory data 166 to generate trajectory segments 168, where each trajectory segment 168 corresponds to a portion of the transformed trajectory data 166 that includes a particular type of motion (e.g., based on detection a change point, as described above). Likewise, the feature determination instructions 134B are executable to generate feature data 170 based on the transformed trajectory data 166.

The feature data 170 is provided as input to the trained classifier to determine a trajectory pattern 172 associated with the trajectory data 164. The trajectory pattern 172 characterizes the trajectory data 164 (or trajectory segments 168 of the trajectory data 164) relative to the sets of trajectory data 114 used to train the trained classifier 126. For example, by determining a trajectory pattern 172 based on prior trajectory data, the trained classifier 126B (or other instructions 162) can predict future behavior of one or more of the objects 190. To illustrate, the trained classifier 126B can predict that the second object 190B will move to a particular position at some future time based on the pattern of behavior represented by the trajectory data 164 and based on the sets of trajectory data 114 used to train the trained classifier 126B indicating that in many previous interactions, when the particular trajectory pattern 172 was present, the second object 190B moved to the particular position relative to the first object 190A.

The response selection instructions 176 are executable to select a response action based on the trajectory pattern 172 and action mapping data 174. The action mapping data 174 includes a table, heuristic rules, or an artificial intelligence-based system to select a response action from a defined set of possible response actions, based on the trajectory pattern 172. The defined set of possible response actions can include, for example, causing the first object to change speed or heading, causing the first object to change altitude, causing the first object to take offensive or defensive actions, generating an alert, etc. The response selection instructions 176 can also cause the selected response action to be initiated or performed. In particular implementations, initiating the response action includes selecting a recommended movement pattern for the first object 190A from among a set of movement patterns and providing the recommended movement pattern to a control system associated with the first object 190A. The response selection instructions 176 can cause the second computer system 152 to send a command or notification to the first object 190A. To illustrate, when the objects 190 are aircraft, performing the response action may include providing an alert to a pilot of the first aircraft, the second aircraft, or both. As another illustrative example, when the first object 190A is an autonomous vehicle, performing the response action can include generating a command to modify the trajectory 192A of the first object 190A.

Figure 2A:
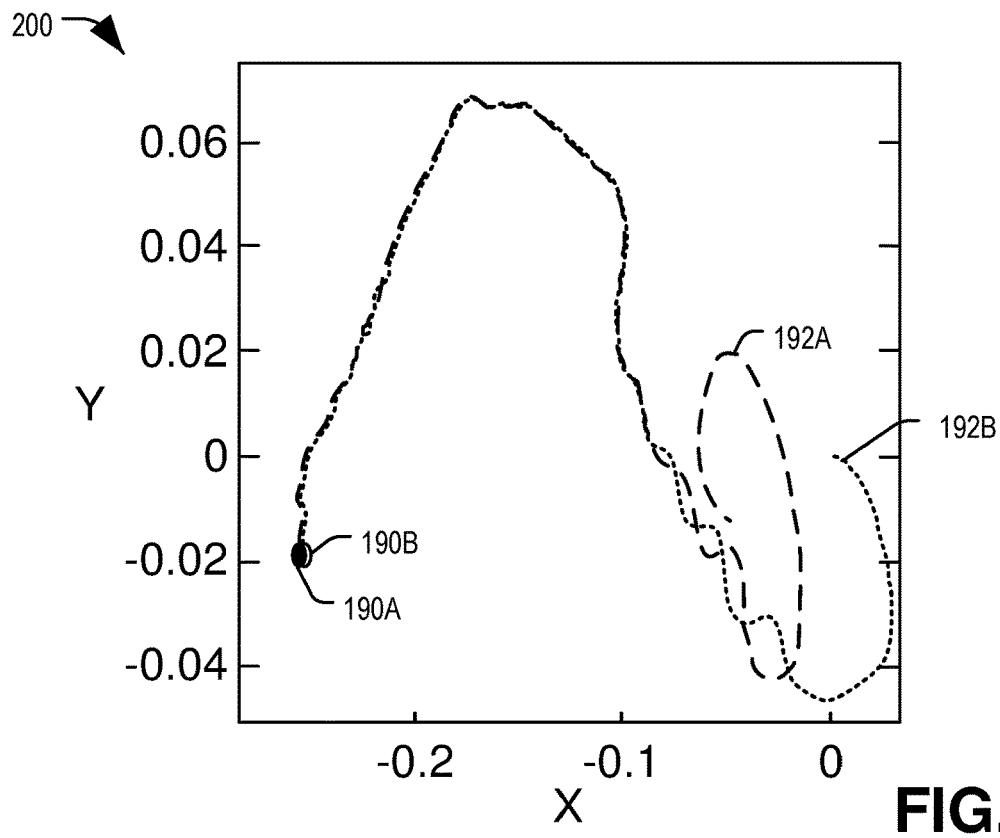
FIGS. 2A and 2B are diagrams that illustrate an example of trajectory normalization by the system of FIG. 1 according to a particular implementation.
Figure 2B:
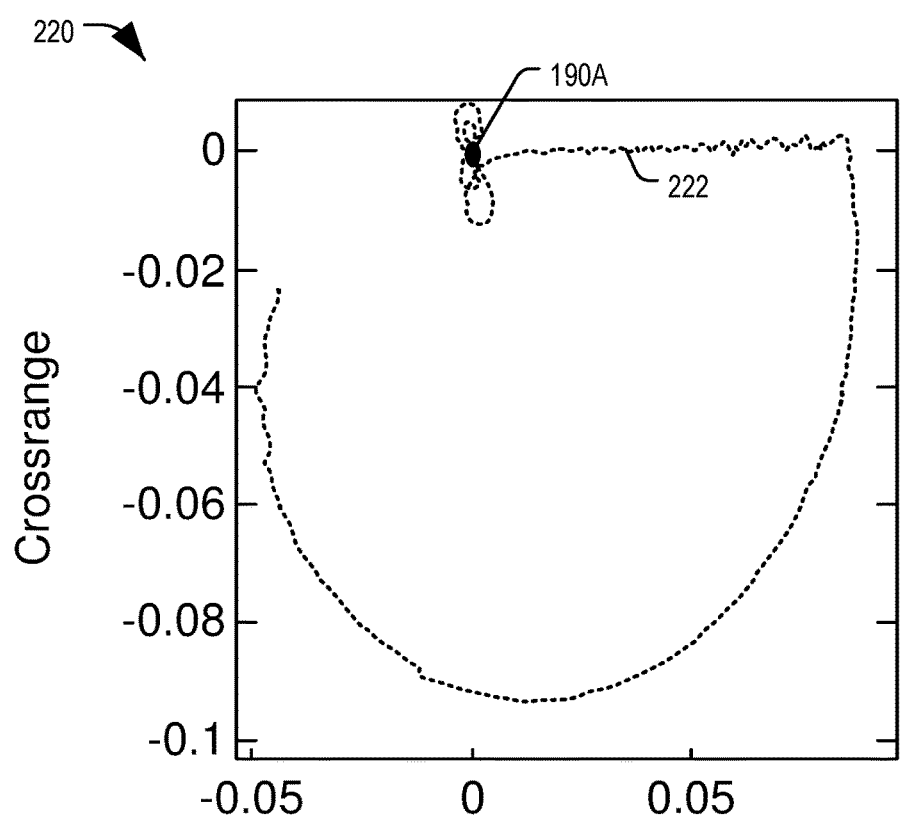
Figure 3A:
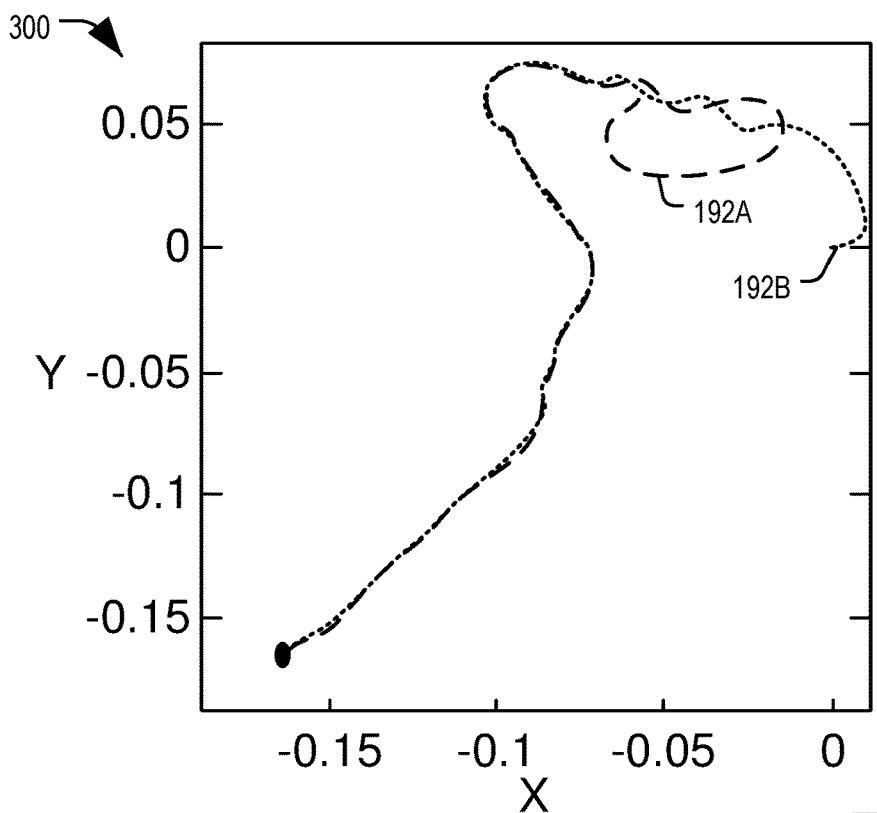
FIGS. 3A and 3B are diagrams that illustrate another example of trajectory normalization by the system of FIG. 1 according to a particular implementation.
Figure 3B:
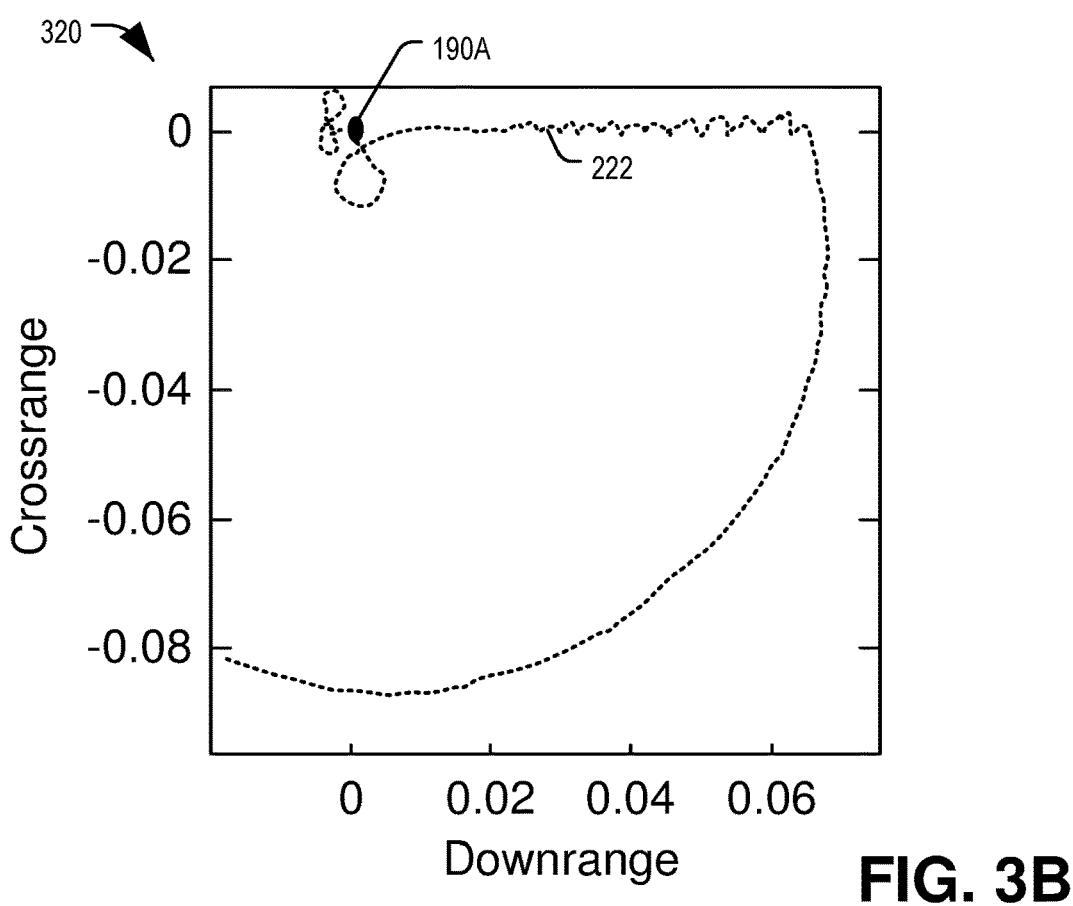

FIGS. 2A, 3A, and 4A graphically illustrate (in two-dimensional (2D) graphs 200, 300, and 400, respectively) 3D trajectory data for the objects 190. FIGS. 2B, 3B, and 4B graphically illustrate (in graphs 220, 320, and 420, respectively) transformed trajectory data for the objects 190. In the transformed trajectory data, the movement of the first object 190A is constrained such that all relative movement of the first and second objects 190 is represented as crossrange or downrange movement of the second object 190B with respect to the heading of the first object 190A. Additionally, FIGS. 4A, 4B, and 4C illustrate trajectory segmentation based on detecting change points in the trajectory data. For example, FIGS. 4A-4C illustrate change points 402A, 402B, and 402C, each of which corresponds to a point between adjacent trajectory segments of the illustrated trajectories. The change points 402A, 402B, and 402C are illustrated in raw trajectory data (e.g., in a 3D Cartesian coordinate system) in the graph 400 of FIG. 4A, in normalized trajectory data 222 in the graph 420 of FIG. 4B, and in a graph 440 of distance between the objects 190 over time in FIG. 4C.

Figure 5:
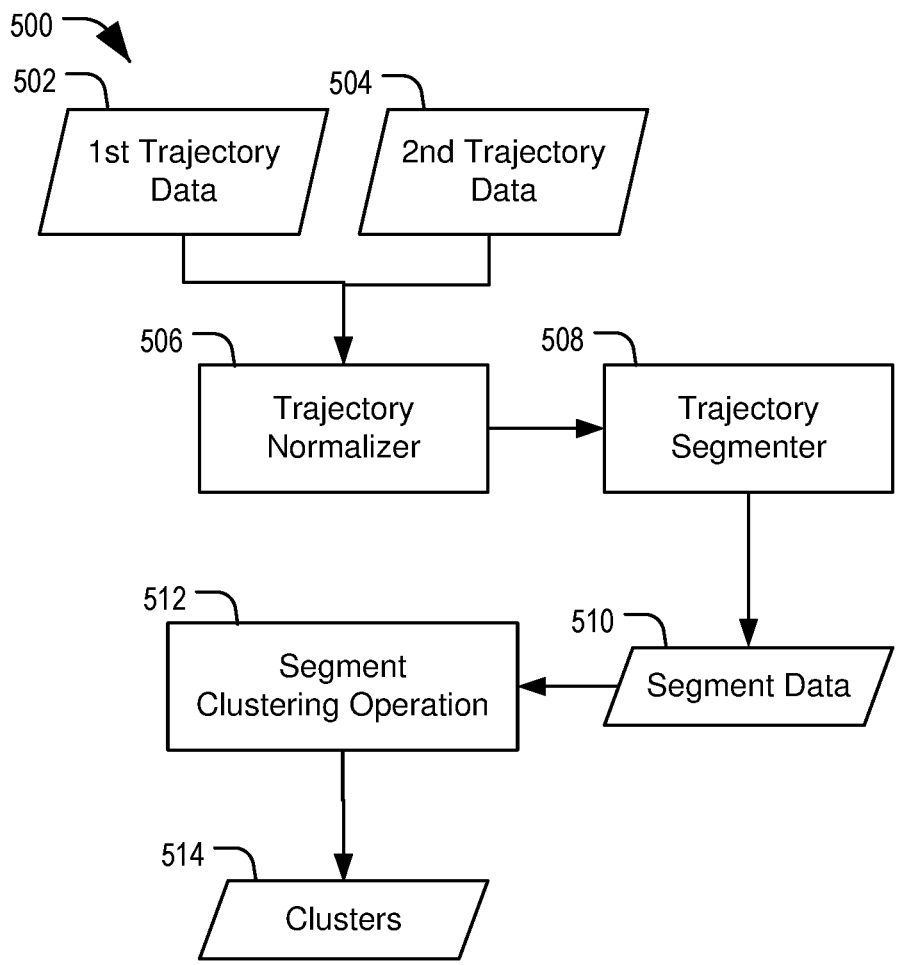
FIG. 5 is a flow diagram illustrating an example of a method of generating training data to train a classifier to label trajectory data.

FIG. 5 is a flow diagram illustrating an example of a method of generating training data to train a classifier to label trajectory data. In FIG. 5, first trajectory data 502 and second trajectory data 504 are received at a trajectory normalizer 506. The first trajectory data 502 includes a plurality of values representing the first trajectory 192A of the first object 190A, and the second trajectory data 504 includes a plurality of values representing the second trajectory 192B of the second object 190B. As an example, the first trajectory data 502 may include a series of Cartesian coordinates indicating positions of the first object 190A at each sample time of a first set of sample times. In this example, the second trajectory data 504 includes a series of Cartesian coordinates indicating positions of the second object 190B at each sample time of a second set of sample times. For certain use cases, the first set of sample times and the second set of sample times are equal or nearly so. For example, to evaluate an interaction between two objects 190 in an adversarial or cooperative context, it would generally be the case the both objects 190 are present and moving in a space at the same time. However, in other use cases, the method 500 can be used to evaluate asynchronous movement of the objects 190 (e.g., to evaluate movement of the objects 190 through the same space at different times), multi-spatial movement of the objects (e.g., to evaluate movement of the objects 190 through different spaces), or both. In such use cases, a reference time and spatial coordinate mapping or scaling may be performed before the trajectories are normalized by the trajectory normalizer 506.

The trajectory normalizer 506 converts the trajectories 192 into normalized trajectories corresponding to the transformed trajectory data 116 of FIG. 1. In a particular example, the trajectories 192 are transformed by setting an initial position (e.g., a first or selected coordinate location) of the first trajectory 192A of the first object 190A as an origin of a transformed coordinate system. The transformed coordinate system is then mathematically rotated and/or translated such that the object 190A always remains on the first axis and all movement of the second object 190B is represented as either crossrange or downrange relative to the first object 190A. To illustrate, the trajectories can be transformed according to the following equations, in which A is a vector of values of the first trajectory 192A, B is corresponding a vector of values of the second trajectory 192B, A* is a vector of values of the normalized first trajectory 192A, B* is a vector of values of the normalized second trajectory 192B, and t is a time value.

$$A(0)=(0,0)$$

$$B^*(t)=B(t)-A(0)$$

$$A^*(t)=A(t)-A(0)$$

After this initial conversion, the trajectories are transformed such that at each sample point, the first trajectory is on the reference axis. At each sample point, this transformation can be viewed as translating the previous sample point back to the origin of the reference frame, rotation about the previous sample point, and translation back. The transformation can be performed using transform matrices, W, as shown below. In the equations below, θ, represents the angle between the angle between the change in $A_2$ and the change in $A_1$; subscripts represent dimensions of the vector quantities; $W_1$ translates to the origin, $W_2$ rotates by theta, $W_3$ undoes the translation to the origin and R is the total transformation.

$$\Delta A(t) = A^*(t) - A^*(t - \Delta t)$$

$$\theta(t) = \mathrm{atan2}(\Delta A_2, \Delta A_1)$$

$$W_1(t) = \begin{bmatrix} 1 & 0 & -A_1^*(t-\Delta t) \\ 0 & 1 & -A_2^*(t-\Delta t) \\ 0 & 0 & 1 \end{bmatrix}$$

$$W_2(t) = \begin{bmatrix} \cos\theta & -\sin\theta & 0 \\ \sin\theta & \cos\theta & 0 \\ 0 & 0 & 1 \end{bmatrix}$$

$$W_3(t) = \begin{bmatrix} 1 & 0 & A_1^*(t-\Delta t) \\ 0 & 1 & A_2^*(t-\Delta t) \\ 0 & 0 & 1 \end{bmatrix}$$

$$R(t) = W_1(t)W_2(t)W_3(t)$$

$$B^*(t) \leftarrow B^*(t)\prod_{s=0}^{t} R(s)$$

$$A^*(t) \leftarrow A^*(t)\prod_{s=0}^{t} R(s)$$

The rotated second trajectory 192B is then transformed to a reference frame relative to the first trajectory 192A and a sign change is applied (if needed) to enforce bilateral symmetry around the first axis as per the following equations.

$$C(t) = B^*(t) - A^*(t)$$

$$C(t) \leftarrow \begin{cases} C(t), & C_1(0) \leq 0 \\ -C(t), & C_1(0) > 0 \end{cases}$$

Returning to FIG. 5, after the trajectory normalizer 506 has converted the trajectory data 502, 504 to map the trajectories 192 to the reference frame in which the first trajectory 192A is constrained, the trajectory segmenter 508 parses the trajectory data 502, 504 into segment data 510. In some implementations, the trajectory data 502, 504 includes data representing multiple trajectory segments 118 that have different shapes representing different kinds of dynamics or behaviors. To cluster at a single behavior level, the trajectory data 502, 504 are parsed into segment data 510, with each entry of the segment data 510 representing a single trajectory segment 118. In a particular implementation, the trajectory segments 118 are separated at change points which are detected using a change point detection process in which change points are detected in each dimension of the trajectory separately, then the change points are combined across dimensions to find points common to all dimensions. In a particular implementation, the change points are detected by sliding two contiguous windows, past (p) and future (f) relative to their shared boundary, along the time series and comparing their respective histograms using Kulback-Liebler Divergence, as described by the following relationships:

$$h_{pi}(t)=\mathrm{hist}(C_i(s|n\Delta t < s < t))$$

$$h_{fi}(t)=\mathrm{hist}(C_i(s|t<s<n\Delta t))$$

$$d_i(t)=D_{KL}(h_{pi}\|h_{fi})$$

$$g(t)=d_i'(t)>0 \wedge d_i'(t+\Delta t)<0 \wedge d_i''(t)<0$$

where n is a window size. In some implementations, g(t) is filtered by a threshold such that:

$$g(t) \leftarrow g(t) \wedge d_i(t) > \Theta$$

where Θ is the minimum divergence that counts as a change (e.g., the minimum divergence to indicate that a change point is present). Using this change point detection process, segments are regions of C(t) with boundaries defined by the true values of g(t), s={t|g(t)}, such that segment i is $C(t|s_i < t < s_{i+1})$.

In the method 500 of FIG. 5, the segment data 510 is provided to a segment clustering operation 512 to group sets (e.g., pairs) of the trajectory segments into clusters 514, where each cluster 514 is associated with one type of behavior. In a particular implementation, the segments are clustered using a hierarchical clustering technique (e.g., an agglomerative clustering technique or a divisive clustering technique). To perform the clustering operation 512, each set of segments (e.g., each pair of segments including a segment of the first trajectory 192A and a corresponding segment of the second trajectory 192B) is represented by feature data. In a particular implementation, the feature data representing a set of segments includes or corresponds to a Fréchet distance, $D_f$ (p, q), between pairs of curves according to the following relationship, in which $D_{ij}$ represents a feature data value for a particular segment pair represented by indices i and j, where i and j are segments chosen from the set of all segments being clustered.

$$D_{ij}=D_f(s_i,s_j) \forall s_i \in S, s_j \in S$$

where $S$ is the set of all segments being clustered. The segment clustering operation 512 assigns a unique identifier to each cluster 514, which can be associated with a user defined label or can be computer assigned.

Figure 6:
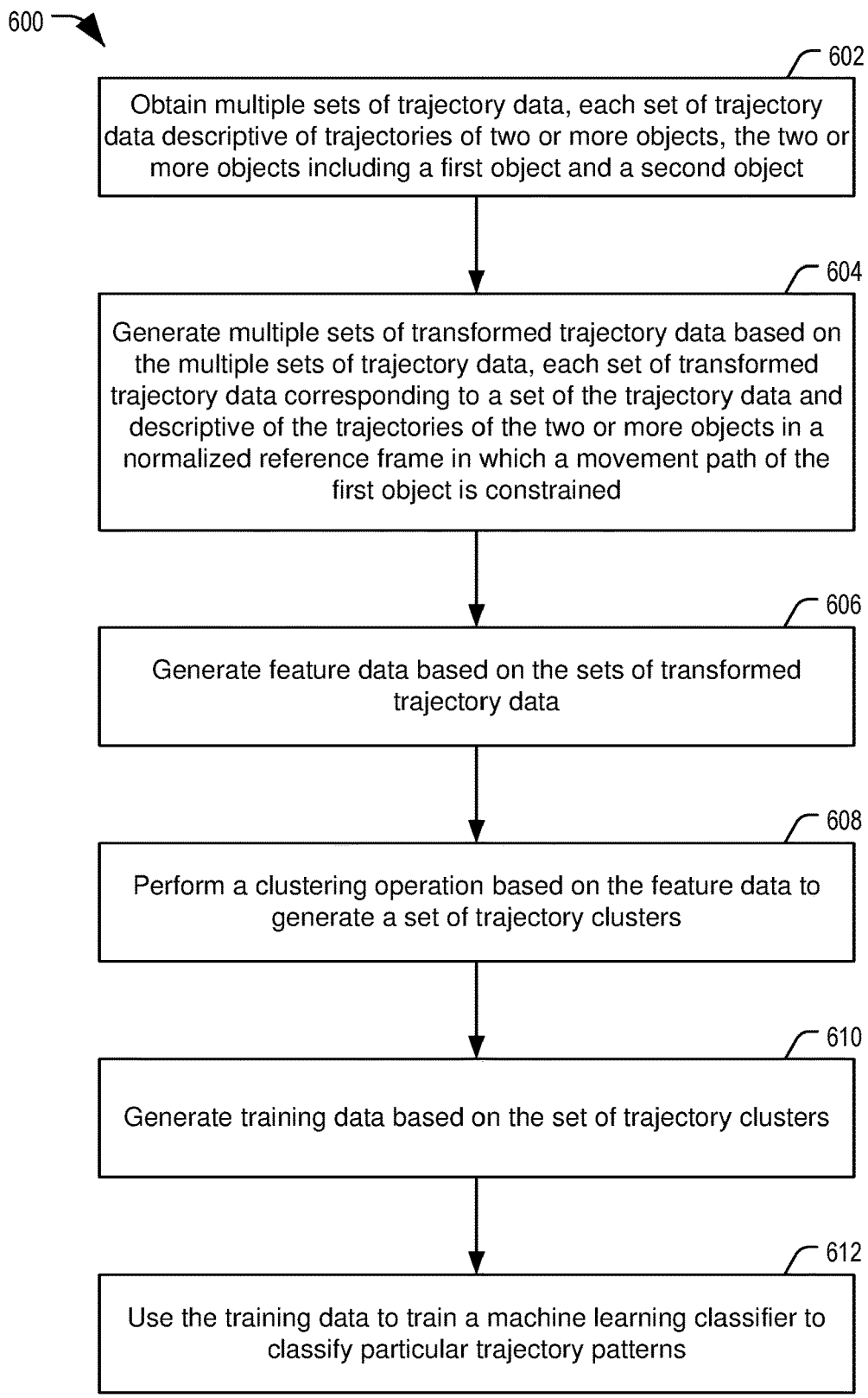
FIG. 6 is a flow diagram illustrating an example of a method of generating a trained classifier according to a particular implementation.

FIG. 6 is a flow diagram illustrating an example of a method 600 of generating a trained classifier according to a particular implementation. The method 600 is a computer controlled method and can be initiated, performed, or controlled by the system 100 or one or more components thereof, such as by the computer system 102, the processors 104, dedicated hardware or firmware components (e.g., an artificial intelligence co-processor), or a combination thereof.

The method 600 includes, at 602, obtaining multiple sets of trajectory data. Each set of trajectory data is descriptive of trajectories of two or more objects, such as a first object and a second object. For example, the two or more objects can include or correspond to the objects 190 of FIG. 1, and the trajectory data can include or correspond to the sets of trajectory data 114 of FIG. 1. The multiple sets of trajectory data can be obtained by one or more processors, such as by a read from a memory of a computer device or accessing a source external to the computer device, such as a remote data storage device, a removable memory device (e.g., a memory card), etc.

The method 600 includes, at 604, generating multiple sets of transformed trajectory data based on the multiple sets of trajectory data. Each set of transformed trajectory data corresponds to a set of the trajectory data and is descriptive of the trajectories of the two or more objects in a normalized reference frame in which a movement path of the first object is constrained. For example, each of the sets of the trajectory data 114 can be transformed, as described above, such that all relative movement of the objects is described in terms of crossrange or downrange motion relative to one of the objects (e.g., the first object 190A).

The method 600 includes, at 606, generating feature data based on the sets of transformed trajectory data. For example, a distance matrix can be generated to describe a distance between two curves, such as a Fréchet distance. In some implementations, the transformed trajectory data is divided into trajectory segments before the feature data is generated. In such implementations, each feature data value corresponds to or represents a trajectory pattern associated with a pair of trajectory segments, such as such as a Fréchet distance between curves defined by the pair of trajectory segment.

The method 600 includes, at 608, performing a clustering operation based on the feature data to generate a set of trajectory clusters. For example, the clustering operation can group the trajectories based on similarity of the feature data descriptive of the trajectories, as indicated by proximity in feature space.

The method 600 includes, at 610, generating training data based on the set of trajectory clusters. As a particular example, the training data includes the feature data associated with a particular pair of trajectories (or trajectory segments) and a label associated with a cluster to which the particular pair of trajectories (or trajectory segments) is assigned by the clustering operation.

The method 600 includes, at 612, using the training data to train a machine learning classifier to classify particular trajectory patterns. For example, the training data can be used as supervised training data to train a machine learning classifier, such as an artificial neural network, a decision tree, a support vector machine, or a variant or ensemble thereof.

Figure 7:
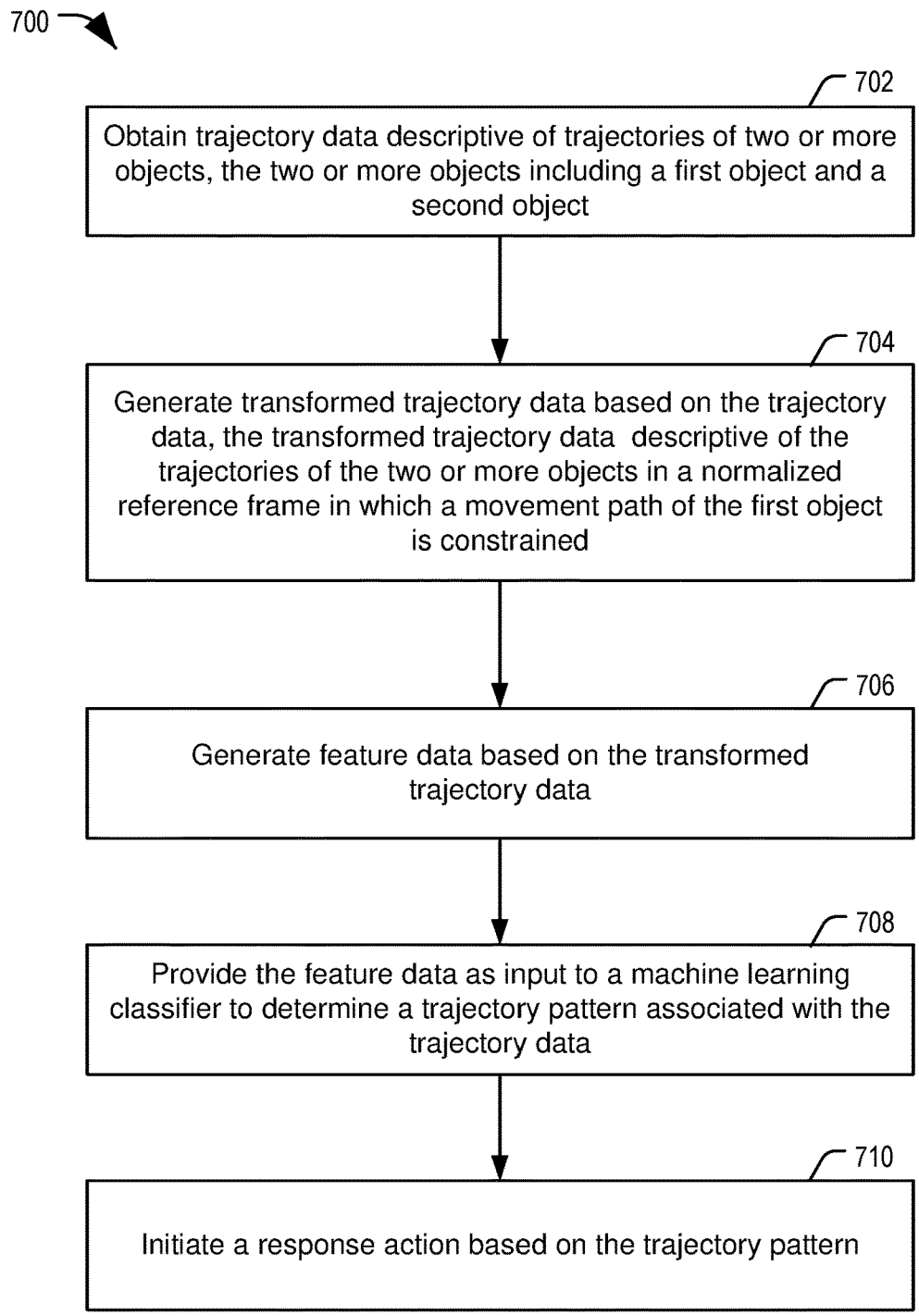
FIG. 7 is a flow diagram illustrating an example of a method of using a trained classifier according to a particular implementation.

FIG. 7 is a flow diagram illustrating an example of a method 700 of using a trained classifier according to a particular implementation. The method 700 is a computer controlled method and can be initiated, performed, or controlled by the system 100 or one or more components thereof, such as by the computer system 152, the processors 154, dedicated hardware or firmware components (e.g., an artificial intelligence co-processor), or a combination thereof.

The method 700 includes, at 702, obtaining trajectory data descriptive of trajectories of two or more objects. For example, the two or more objects can include or correspond to the objects 190 of FIG. 1, and the trajectory data can include or correspond to the trajectory data 164 of FIG. 1. The trajectory data can be obtained by one or more processors, such as by a read from a memory of a computer device or accessing a source external to the computer device, such as a remote data storage device, a removable memory device (e.g., a memory card), the system 194 of FIG. 1, etc.

The method 700 includes, at 704, generating transformed trajectory data based on the trajectory data. The transformed trajectory data is descriptive of the trajectory data normalized to a reference frame in which a movement path of a first object is constrained, and all relative movement of the objects is described in terms of crossrange or downrange motion relative to the first object.

The method 700 includes, at 706, generating feature data based on the transformed trajectory data. For example, a Fréchet distance can be calculated for the trajectories, as a pair (or in pairs if the movements of more than two objects 190 are being evaluated).

The method 700 includes, at 708, providing the feature data as input to a machine learning classifier to determine a trajectory pattern associated with the trajectory data. For example, the machine learning classifier can include or correspond to the trained classifier 126. The method 700 also includes, at 710, initiating a response action based on the trajectory pattern. For example, the response action can include causing one or more of the objects to change speed or heading, causing the one or more of the objects to change altitude, causing one or more of the objects to take offensive or defensive actions, generating an alert, etc.

Figure 8:
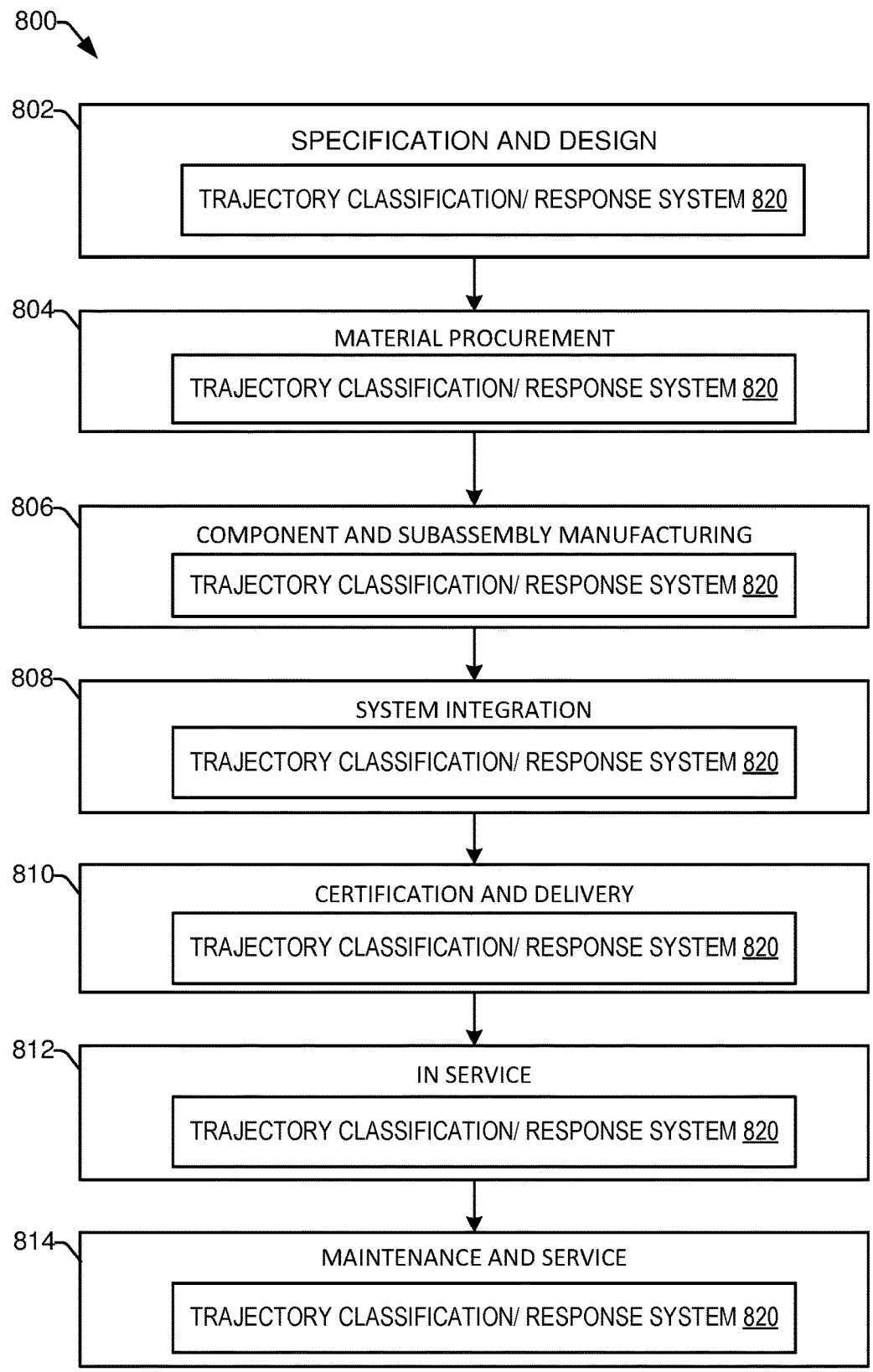
FIG. 8 is a flow diagram illustrating an example of a life cycle of an aircraft that includes a trajectory classification and response system according to a particular implementation.

FIG. 8 is a flowchart illustrating a life cycle 800 of an aircraft that includes a trajectory classification and response system 820. The trajectory classification and response system 820 includes, corresponds to, or is included within the computer system 102 of FIG. 1, the computer system 152 of FIG. 1, or a combination thereof.

During pre-production, the exemplary life cycle 800 includes, at 802, specification and design of an aircraft, such as the aircraft 900 described with reference to FIG. 9. During specification and design of the aircraft, the life cycle 800 may include specification and design of the trajectory classification and response system 820. At 804, the life cycle 800 includes material procurement, which may include procuring materials for the trajectory classification and response system 820.

During production, the life cycle 800 includes, at 806, component and subassembly manufacturing and, at 808, system integration of the aircraft. For example, the life cycle 800 may include component and subassembly manufacturing of the trajectory classification and response system 820 and system integration of the trajectory classification and response system 820. At 810, the life cycle 800 includes certification and delivery of the aircraft and, at 812, placing the aircraft in service. Certification and delivery may include certification of the trajectory classification and response system 820 to place the trajectory classification and response system 820 in service. While in service by a customer, the aircraft may be scheduled for routine maintenance and service (which may also include modification, reconfiguration, refurbishment, and so on). At 814, the life cycle 800 includes performing maintenance and service on the aircraft, which may include performing maintenance and service on the trajectory classification and response system 820.

Each of the processes of the life cycle 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 9:
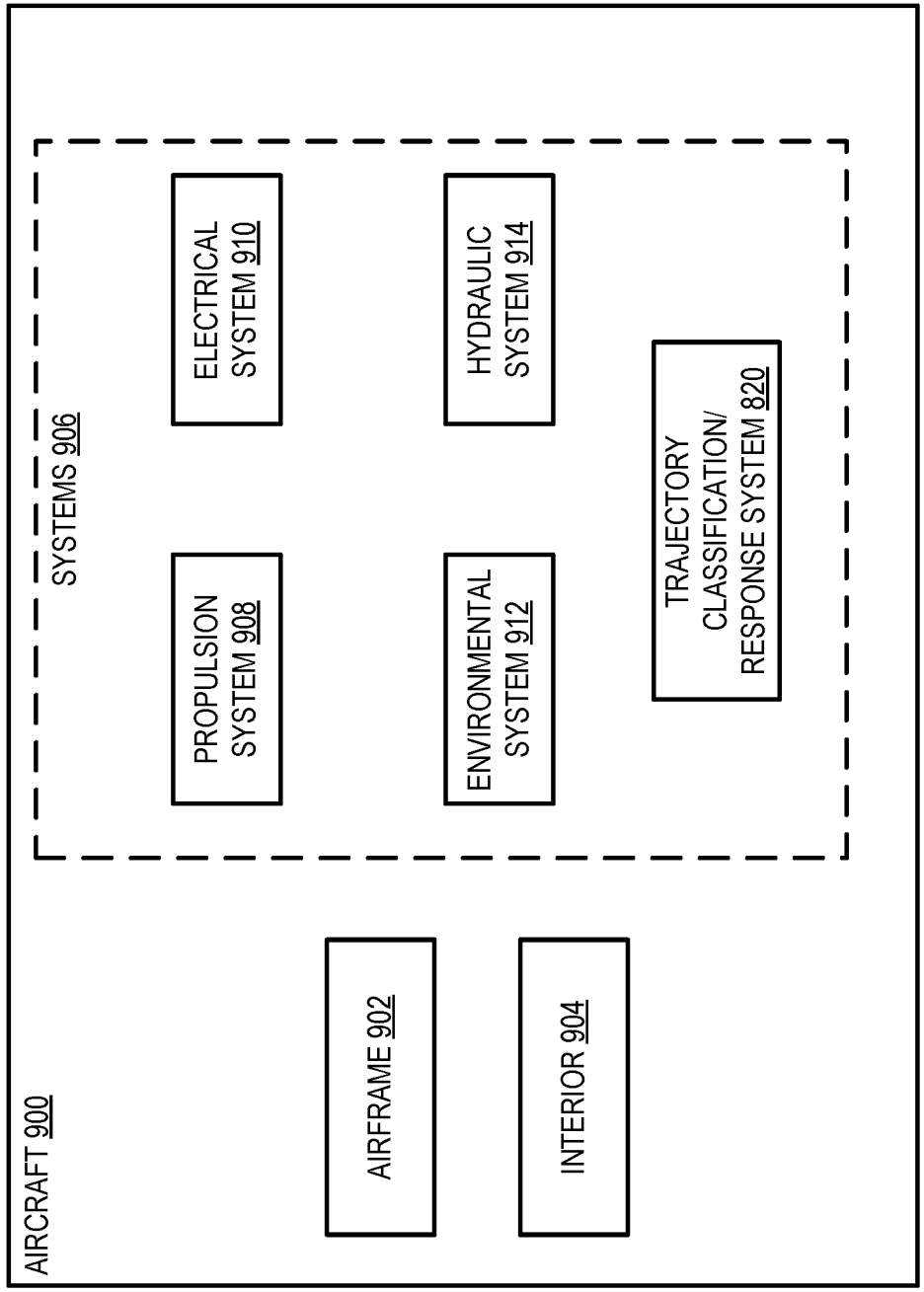
FIG. 9 is a diagram illustrating an example of an aircraft that includes a trajectory classification and response system according to a particular implementation.

FIG. 9 is a diagram illustrating an example of an aircraft 900 that includes the trajectory classification and response system 820 according to a particular implementation. In the example of FIG. 9, the aircraft 900 includes an airframe 902 with a plurality of systems 906 and an interior 904. Examples of the plurality of systems 906 include one or more of a propulsion system 908, an electrical system 910, an environmental system 912, a hydraulic system 914, and the trajectory classification and response system 820. Any number of other systems may be included.

Figure 10:
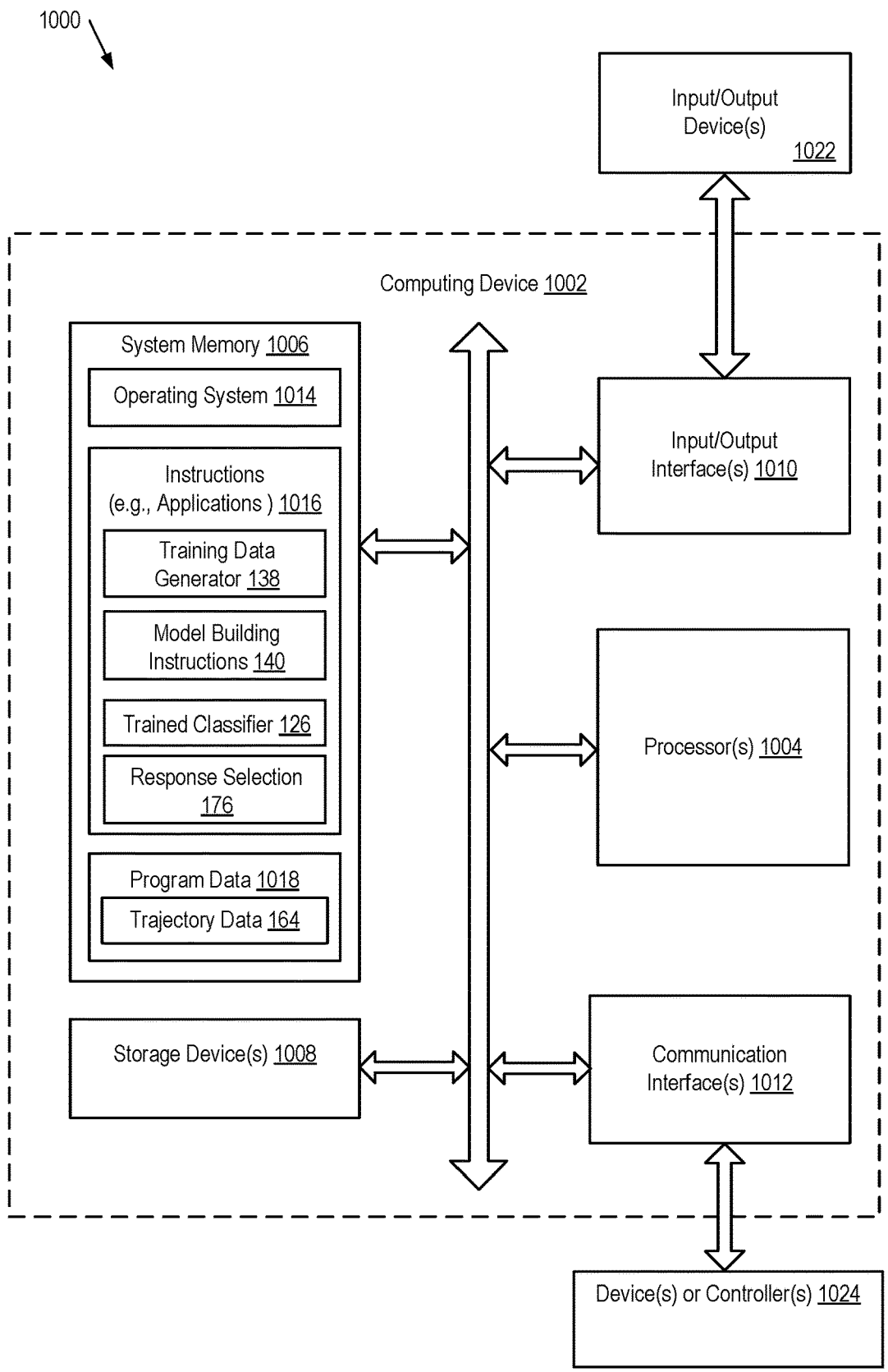
FIG. 10 is a block diagram of a computing environment including a computing device configured to support aspects of computer-implemented methods and computer-executable program instructions (or code) according to the present disclosure.

FIG. 10 is a block diagram of a computing environment 1000 including a computing device 1002 configured to support aspects of computer-implemented methods and computer-executable program instructions (or code) according to the present disclosure. For example, the computing device 1002, or portions thereof, is configured to execute instructions to initiate, perform, or control one or more operations described with reference to FIGS. 1-9. In particular examples, the computing device 1002 includes, corresponds to, or is included within the computer system 102 of FIG. 1, the computer system 152 of FIG. 1, or a combination thereof The computing device 1002 includes one or more processors 1004. The processor(s) 1004 are configured to communicate with system memory 1006, one or more storage devices 1008, one or more input/output interfaces 1010, one or more communications interfaces 1012, or any combination thereof. The system memory 1006 is a computer-readable storage device and includes volatile memory devices (e.g., random access memory (RAM) devices), nonvolatile memory devices (e.g., read-only memory (ROM) devices, programmable read-only memory, and flash memory), or both. The system memory 1006 stores an operating system 1014, which may include a basic input/output system for booting the computing device 1002 as well as a full operating system to enable the computing device 1002 to interact with users, other programs, and other devices. The system memory 1006 stores system (program) data 1018, such as the trajectory data 164.

The system memory 1006 includes one or more applications 1016 (e.g., sets of instructions) executable by the processor(s) 1004. As an example, the one or more applications 1016 include instructions executable by the processor(s) 1004 to initiate, control, or perform one or more operations described with reference to FIGS. 1-9. To illustrate, the one or more applications 1016 include instructions executable by the processor(s) 1004 to initiate, control, or perform one or more operations described with reference to the computer system 102, the computer system 152, or the trajectory classification/response system 820, or a combination thereof.

The one or more storage devices 1008 include nonvolatile storage devices, such as magnetic disks, optical disks, or flash memory devices. In a particular example, the storage devices 1008 include both removable and non-removable memory devices. The storage devices 1008 are configured to store an operating system, images of operating systems, applications (e.g., one or more of the applications 1016), and program data (e.g., the program data 1018). In a particular aspect, the system memory 1006, the storage devices 1008, or both, include tangible (e.g., non-transitory) computer-readable media. In a particular aspect, one or more of the storage devices 1008 are external to the computing device 1002.

The one or more input/output interfaces 1010 that enable the computing device 1002 to communicate with one or more input/output devices 1022 to facilitate user interaction. For example, the one or more input/output interfaces 1010 can include a display interface, an input interface, or both. For example, the input/output interface 1010 is adapted to receive input from a user, to receive input from another computing device, or a combination thereof. In some implementations, the input/output interface 1010 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 1022 includes one or more user interface devices and displays, including some combination of buttons, keyboards, pointing devices, displays, speakers, microphones, touch screens, and other devices.

The processor(s) 1004 are configured to communicate with devices or controllers 1024 via the one or more communications interfaces 1012. For example, the one or more communications interfaces 1012 can include a network interface. The devices or controllers 1024 can include, for example, one or more of the objects 190, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-10. In some implementations, part or all of one or more of the operations or methods of FIGS. 1-10 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
obtaining multiple sets of trajectory data, each set of trajectory data descriptive of trajectories of two or more objects, the two or more objects including a first object and a second object;
generating multiple sets of transformed trajectory data based on the multiple sets of trajectory data, each set of transformed trajectory data corresponding to a set of the trajectory data and descriptive of the trajectories of the two or more objects in a normalized reference frame in which a movement path of the first object is constrained;
generating feature data based on the sets of transformed trajectory data;
performing a clustering operation based on the feature data to generate a set of trajectory clusters;
generating training data based on the set of trajectory clusters; and
using the training data to train a machine learning classifier to classify particular trajectory patterns.

2. The method of claim 1, wherein generating the feature data comprises parsing one or more of the sets of transformed trajectory data to generate two or more trajectory segments, and wherein the feature data is based on the trajectory segments.

3. The method of claim 2, wherein parsing a particular set of transformed trajectory data of the one or more sets of transformed trajectory data comprises:
detecting a change point in a pair of trajectories represented by the particular set of transformed trajectory data; and
dividing the particular set of transformed trajectory data into two segments including a first segment corresponding to a first portion of the particular set of transformed trajectory data representing movements before the change point and a second portion of the particular set of transformed trajectory data representing movements after the change point.

4. The method of claim 3, wherein detecting the change point comprises determining a divergence value based on a first distribution of relative positions during a first time window and a second distribution of relative positions during a second time window following the first time window, wherein the change point is detected responsive to the divergence value satisfying a boundary criterion.

5. The method of claim 1, wherein generating the feature data comprises generating a distance value for each pair of trajectories.

6. The method of claim 1, wherein the clustering operation includes or corresponds to a hierarchical clustering operation.

7. The method of claim 1, wherein the feature data includes a plurality of data elements, each data element of the plurality of data elements representing a respective set of transformed trajectory data, and further comprising associating a label with each trajectory cluster of the set of trajectory clusters, wherein the training data comprises the sets of transformed trajectory data and a label associated with each set of transformed trajectory data, the label associated with a particular set of transformed trajectory data is based on a particular trajectory cluster to which the particular set of transformed trajectory data is assigned.

8. The method of claim 1, further comprising, after training the machine learning classifier:
providing data descriptive of trajectories of two or more aircraft as input to the machine learning classifier to generate a trajectory pattern classification output; and
using the trajectory pattern classification output to modify one or more of a heading, an altitude, or a speed of a first aircraft of the two or more aircraft.

9. The method of claim 1, wherein the movement path of the first object is constrained in the normalized reference frame to movement along a single axis.

10. A computer-readable storage device storing instructions that are executable by one or more processors to cause the one or more processors to perform operations comprising:
obtaining multiple sets of trajectory data, each set of trajectory data descriptive of trajectories of two or more objects, the two or more objects including a first object and a second object;
generating multiple sets of transformed trajectory data based on the multiple sets of trajectory data, each set of transformed trajectory data corresponding to a set of the trajectory data and descriptive of the trajectories of the two or more objects in a normalized reference frame in which a movement path of the first object is constrained;
generating feature data based on the sets of transformed trajectory data;
performing a clustering operation based on the feature data to generate a set of trajectory clusters;
generating training data based on the set of trajectory clusters; and
using the training data to train a machine learning classifier to classify particular trajectory patterns.

11. The computer-readable storage device of claim 10, wherein generating the feature data comprises parsing one or more of the sets of transformed trajectory data to generate two or more trajectory segments, and wherein the feature data is based on the trajectory segments.

12. The computer-readable storage device of claim 11, wherein parsing a particular set of transformed trajectory data of the one or more sets of transformed trajectory data comprises:
detecting a change point in a pair of trajectories represented by the particular set of transformed trajectory data; and
dividing the particular set of transformed trajectory data into two segments including a first segment corresponding to a first portion of the particular set of transformed trajectory data representing movements before the change point and a second portion of the particular set of transformed trajectory data representing movements after the change point.

13. The computer-readable storage device of claim 12, wherein detecting the change point comprises determining a divergence value based on a first distribution of relative positions during a first time window and a second distribution of relative positions during a second time window following the first time window, and wherein the change point is detected responsive to the divergence value satisfying a boundary criterion.

14. The computer-readable storage device of claim 10, wherein generating the feature data comprises generating a distance value for each pair of trajectories.

15. The computer-readable storage device of claim 10, wherein the clustering operation includes or corresponds to a hierarchical clustering operation.

16. The computer-readable storage device of claim 10, wherein the feature data includes a plurality of data elements, each data element of the plurality of data elements representing a respective set of transformed trajectory data, and further comprising associating a label with each trajectory cluster of the set of trajectory clusters, wherein the training data comprises the sets of transformed trajectory data and a label associated with each set of transformed trajectory data, the label associated with a particular set of transformed trajectory data is based on a particular trajectory cluster to which the particular set of transformed trajectory data is assigned.

17. The computer-readable storage device of claim 10, wherein the operations further comprise, after training the machine learning classifier:
providing data descriptive of trajectories of two or more aircraft as input to the machine learning classifier to generate a trajectory pattern classification output; and
using the trajectory pattern classification output to modify one or more of a heading, an altitude, or a speed of a first aircraft of the two or more aircraft.

18. The computer-readable storage device of claim 10, wherein the movement path of the first object is constrained in the normalized reference frame to movement along a single axis.

19. A system comprising:
one or more processors; and
one or more memory devices coupled to the one or more processors and storing instructions that are executable by the one or more processors to cause the one or more processors to:
obtain multiple sets of trajectory data, each set of trajectory data descriptive of trajectories of two or more objects, the two or more objects including a first object and a second object;
generate multiple sets of transformed trajectory data based on the multiple sets of trajectory data, each set of transformed trajectory data corresponding to a set of the trajectory data and descriptive of the trajectories of the two or more objects in a normalized reference frame in which a movement path of the first object is constrained;
generate feature data based on the sets of transformed trajectory data;
perform a clustering operation based on the feature data to generate a set of trajectory clusters;
generate training data based on the set of trajectory clusters; and
use the training data to train a machine learning classifier to classify particular trajectory patterns.

20. The system of claim 19, wherein generating the feature data comprises parsing one or more of the sets of transformed trajectory data to generate two or more trajectory segments based on divergence of a distribution of relative positions of the two or more objects indicated by the sets of transformed trajectory data.

21. A method comprising:
obtaining trajectory data descriptive of trajectories of two or more objects, the two or more objects including a first object and a second object;
generating transformed trajectory data based on the trajectory data, the transformed trajectory data descriptive of the trajectories of the two or more objects in a normalized reference frame in which a movement path of the first object is constrained;
generating feature data based on the transformed trajectory data;
providing the feature data as input to a machine learning classifier to determine a trajectory pattern associated with the trajectory data; and
initiating a response action based on the trajectory pattern.

22. The method of claim 21, wherein the first object is an aircraft and wherein the response action includes providing an alert to a pilot of the aircraft.

23. The method of claim 21, wherein the first object is an autonomous vehicle and wherein the response action includes generating a command to modify at least one of a heading, an altitude, or a speed of the first object.

24. The method of claim 21, wherein initiating the response action includes selecting, from among a set of movement patterns, a recommended movement pattern for the first object and providing the recommended movement pattern to a control system associated with the first object.

25. The method of claim 21, wherein generating the feature data comprises:
detecting a change point in the transformed trajectory data; and
dividing the transformed trajectory data into two segments including a first segment corresponding to a first portion representing movements before the change point and a second portion representing movements after the change point.

26. The method of claim 25, wherein detecting the change point comprises determining a divergence value based on a first distribution of relative positions during a first time window and a second distribution of relative positions during a second time window following the first time window, and wherein the change point is detected responsive to the divergence value satisfying a boundary criterion.

27. The method of claim 21, wherein generating the feature data comprises generating a distance value for each pair of the trajectories.

28. The method of claim 21, wherein the machine learning classifier is trained based on clusters of normalized trajectory data for a plurality of multi-object interactions.

29. The method of claim 21, wherein the two or more objects include two or more aircraft.

30. The method of claim 21, wherein the movement path of the first object is constrained in the normalized reference frame to movement along a single axis.

31. A computer-readable storage device storing instructions that are executable by one or more processors to cause the one or more processors to perform operations comprising:
obtaining trajectory data descriptive of trajectories of two or more objects, the two or more objects including a first object and a second object;
generating transformed trajectory data based on the trajectory data, the transformed trajectory data descriptive of the trajectories of the two or more objects in a normalized reference frame in which a movement path of the first object is constrained;

generating feature data based on the transformed trajectory data;

providing the feature data as input to a machine learning classifier to determine a trajectory pattern associated with the trajectory data; and initiating a response action based on the trajectory pattern.

32. The computer-readable storage device of claim 31, wherein the first object is an aircraft and wherein the response action includes providing an alert to a pilot of the aircraft.

33. The computer-readable storage device of claim 31, wherein the first object is an autonomous vehicle and wherein the response action includes generating a command to modify a trajectory of the first object.

34. The computer-readable storage device of claim 31, wherein initiating the response action includes selecting, from among a set of movement patterns, a recommended movement pattern for the first object and providing the recommended movement pattern to a control system associated with the first object.

35. The computer-readable storage device of claim 31, wherein generating the feature data comprises segmenting the transformed trajectory data into a first portion representing movements before a change point and a second portion representing movements after the change point.

36. The computer-readable storage device of claim 35, wherein the operations further comprise detecting the change point based on a divergence value, wherein the divergence value is based on distributions of relative positions of the two or more objects over time.

37. A system comprising:
one or more processors; and
one or more memory devices coupled to the one or more processors and storing instructions that are executable by the one or more processors to cause the one or more processors to:
  obtain trajectory data descriptive of trajectories of two or more objects, the two or more objects including a first object and a second object;
  generate transformed trajectory data based on the trajectory data, the transformed trajectory data descriptive of the trajectories of the two or more objects in a normalized reference frame in which a movement path of the first object is constrained;
  generate feature data based on the transformed trajectory data;
  provide the feature data as input to a machine learning classifier to determine a trajectory pattern associated with the trajectory data; and
  initiate a response action based on the trajectory pattern.

38. The system of claim 37, wherein generating the feature data comprises generating a distance value for each pair of the trajectories.

39. The system of claim 37, wherein the machine learning classifier is trained based on clusters of normalized trajectory data for a plurality of multi-object interactions.

40. The system of claim 37, wherein the movement path of the first object is constrained in the normalized reference frame to movement along a single axis.

* * * * *